United States Patent [19]

Houck

[11] 4,229,735
[45] Oct. 21, 1980

[54] RIP DETECTOR SIGNAL DETECTION CIRCUIT

[75] Inventor: Robert J. Houck, Akron, Ohio

[73] Assignee: The B. F. Goodrich Company, Akron, Ohio

[21] Appl. No.: 871,664

[22] Filed: Jan. 23, 1978

[51] Int. Cl.² .................. B65G 43/02; G08B 21/00; H04B 1/10

[52] U.S. Cl. ........................... 340/676; 307/351; 307/358; 328/146; 329/109; 329/204; 340/572

[58] Field of Search ............. 340/531, 537, 561, 562, 340/572, 673, 674, 675, 676, 679; 307/350, 351, 356, 358, 362; 329/109, 178, 179, 203, 204, 206; 325/487, 322; 328/146, 147, 117

[56] References Cited

U.S. PATENT DOCUMENTS

| | | | |
|---|---|---|---|
| 3,286,031 | 11/1966 | Geddes | 307/351 X |
| 3,341,781 | 9/1967 | Rooks | 325/487 X |
| 3,386,042 | 5/1968 | Moes | 329/204 |
| 3,479,599 | 11/1969 | Molik | 328/146 |
| 3,577,136 | 5/1971 | Wolf | 340/572 |
| 3,609,407 | 9/1971 | Garuts | 307/351 X |
| 3,792,459 | 2/1974 | Snyder | 340/676 |
| 3,950,694 | 4/1976 | Maas | 307/350 X |
| 4,127,817 | 11/1978 | Bell, Jr. | 307/358 |

FOREIGN PATENT DOCUMENTS

| | | |
|---|---|---|
| 1008810 | 11/1965 | United Kingdom . |
| 1148428 | 4/1969 | United Kingdom . |
| 1187516 | 4/1970 | United Kingdom . |
| 1234315 | 6/1971 | United Kingdom . |
| 1359903 | 7/1974 | United Kingdom . |

Primary Examiner—John W. Caldwell, Sr.
Assistant Examiner—Joseph E. Nowicki
Attorney, Agent, or Firm—James R. Lindsay

[57] ABSTRACT

A detection circuit accurately monitors an AC signal, which is pulse modulated by information characteristic or indicative of the integrity of a conveyor belt or the like, to provide a distinguishable output representative of such integrity. Such distinguishable output may be utilized for display purposes and/or for control purposes to stop a ripped conveyor belt.

The detection circuit includes a combination circuit of a voltage doubler with high pass filters utilizing full wave rectifiers, RC filters, and a common summing junction. The detection circuit also includes a DC level detector with an automatic gain response adjustment.

28 Claims, 4 Drawing Figures

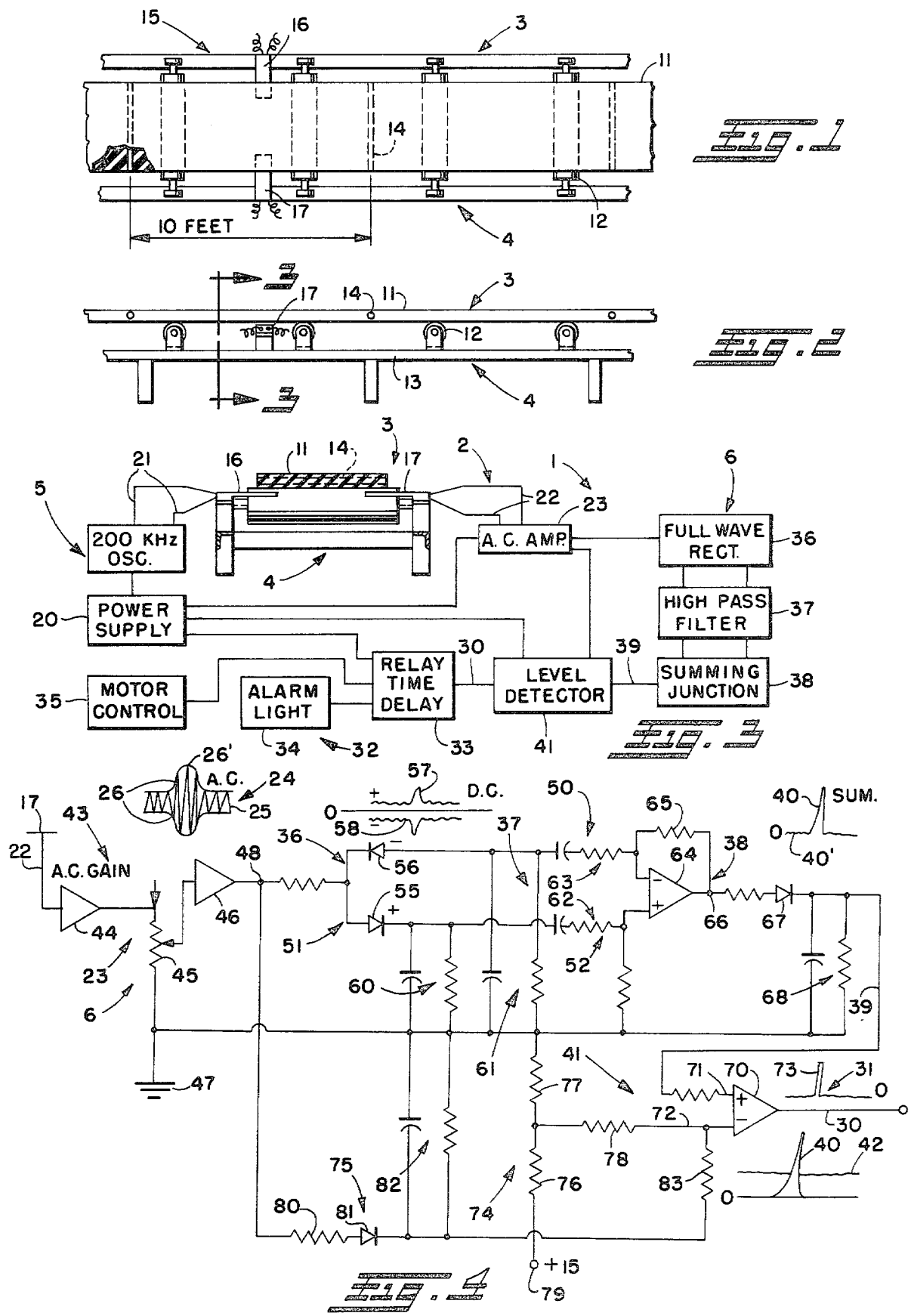

RIP DETECTOR SIGNAL DETECTION CIRCUIT

BACKGROUND OF THE INVENTION

The present invention relates generally to detection circuits and, more particularly, to an improved detection circuit for conveyor belt rip detectors. The invention also is directed to a circuit for converting a pulse height modulated AC signal to a DC pulse and to a variable level detecting circuit, with these being described in detail below with reference to their inclusion in the detection circuit of a conveyor belt rip detector system.

In large endless conveyor belts of the type having a non-metallic body used to convey bulk material, there is a possibility of encountering a rip in the belt caused, for example, by a sharp object dropped thereon at the loading station. It is desirable promptly to detect such rips and, preferably, to shut down the conveyor belt upon such detection, thereby minimizing damage to the belt.

In. U.S. Pat. No. 3,792,459 there is disclosed a conveyor belt rip detector of the type with which the detection circuitry of the present invention may be employed. In such rip detector a plurality of antennae, which may be single electrical conductors, are embedded transversely at spaced-apart locations in the belt so as periodically to couple an electrical signal from a transmitter to a receiver while the belt moves and the respective antennae pass respective capacitive connections to the transmitter and receiver.

The electrical signal charge capacitively induced in each of the unbroken antennae is, thus, transmitted through to the receiver and is sensed by the detector circuitry thereof. However, a broken antenna, for example at a place where the belt has been ripped, will not couple the transmitter signal through to the receiver, and the detector circuit, then, senses the same. Moreover, the detector circuit disclosed in such patent is operative after the lapse of a predetermined time period, which corresponds to the time required for passage of a given number of broken antennae past the transmitter and receiver without the coupling of the transmitter signal to the receiver, to produce a distinguishable output that activates an alarm and/or deactivates the conveyor belt drive.

In such a rip detector system the raw input signal received at the receiver from respective antennae passing the same is an AC pulse height modulated signal, the AC portion being derived from the transmitter and the pulse height modulation occurring in response to the proximity of the respective antennae to capacitive connection plates associated with the transmitter and receiver. The pulse height of such modulated signal, therefore, provides the characteristic information indicative of the integrity condition of the belt. Thus, the non-presence of a pulse, when one is expected, or the presence of pulses with too small a pulse height are interpreted by the detector circuitry as a fault or ripped belt condition. However, conveyor belts and rip detectors often are used in electrically noisy environments, and such electrical noise may incorrectly be interpreted by the detector circuitry as the passage of an antenna. Moreover, the spacing of the capacitive coupling plates or the like relative to the conveyor belt and the antennae may vary, for example, as the conveyor belt stretches and shrinks with use, temperature, etc., thereby creating corresponding variations in the magnitude of the pulse received by the receiver.

It is, accordingly, desirable to avoid the detriment effected by such electrical noise and/or spacing variations, thereby to improve the reliable operation of a conveyor belt rip detector system.

SUMMARY OF THE INVENTION

In accordance with the present invention there is provided improved detector circuitry for a conveyor belt rip detector system to reduce and/or to overcome the aforementioned problems. More particularly, the detector circuitry of the invention includes a combined voltage doubler and high pass filter circuit that in effect doubles or magnifies the pulse characteristic information carried by the raw input signal to the rip detector receiver. In accordance with one aspect of the invention such voltage doubler and high pass filter circuit uses a full wave rectifier to isolate the opposite polarity components of such raw input signal, plural high pass filters for isolating the respective pulses contained in each component, and a summing junction that combines the two components to provide a pulse output having a magnitude larger than each of the pulse components. The detector circuitry of the invention also includes a DC level detector with an automatic gain response adjustment. Such level detector is used to detect the magnitude of the pulse issuing from the voltage doubler and filter circuitry. In accordance with another aspect of the invention, the level detector utilizes a comparator amplifier which compares the pulse output from the voltage doubler and high pass filter circuitry with a reference signal from a reference circuit. Moreover, such reference signal is altered in proportion to a parameter of the raw input signal to the rip detector, thus effecting automatic adjustment of the gain response for such comparator.

It is, accordingly, a primary object of the present invention to provide such detector circuitry that is improved in the noted respects and, more particularly, to provide the same in connection with a conveyor belt rip detector system.

Another object is to improve the detection capabilities and/or noise immunities of a detector circuit and, more particularly, to effect the same in a detector circuit for a conveyor belt rip detector system.

An additional object is to adjust automatically the gain response of a DC level detector, and, more particularly, to effect such adjustment in proportion to a parameter of an input signal thereto.

Still another object is to obtain accurate detection of rips or the like in a conveyor belt.

Still an additional object is to minimize the number of parts required to convert an AC signal that is pulse modulated with characteristic information to a substantially DC signal containing such characteristic information at a magnified level.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawing setting forth in detail a certain illustrative embodiment of the invention, this being indicative, however, of but one of the various ways in which the principles of the invention may be employed.

BRIEF DESCRIPTION OF THE DRAWING

In the annexed drawing:

FIG. 1 is a schematic plan view of a portion of a conveyor belt traveling over support rollers, shows in dashed line the antennae embedded in the belt, and illustrates the position of the transmitter plate and the receiver or detector plate for the electronic portion of the rip detector;

FIG. 2 is a side elevation view of the belt installation of FIG. 1 and shows the transmitter plate positioned closely adjacent the under surface of the load-carrying span of the belt for periodic capacitive coupling with respective antennae as they pass over such transmitter plate;

FIG. 3 is a schematic diagram in block form illustrating the detector circuitry of the present invention in connection with an overall conveyor belt rip detector system; and FIG. 4 is a schematic electric circuit diagram of the detector circuitry in accordance with the present invention with the wave shapes of various electrical signals at certain locations in that circuit also being illustrated.

DESCRIPTION OF THE PREFERRED EMBODIMENT

Referring now in detail to the drawing, and initially to FIGS. 1, 2 and 3, the detector circuitry in accordance with the present invention is generally indicated at 1 in connection with a conveyor belt rip detector system 2 that is used with a conveyor 3 in a conveyor belt system 4 that may convey material from one location to another. As the conveyor 3 is operated it is the purpose of the rip detector system 2 to detect a rip, tear, or other similar flaw. To effect such detection, the rip detector system 2 uses a transmitter 5, which generates an AC signal, and a receiver 6 which receives the transmitter signal with characteristic information representative of the conveyor integrity, for example, impressed thereon. The detector circuitry 1 facilitates analysis of the received signal to detect with accuracy and reliability the condition of conveyor 3.

The conveyor 3 is an endless, non-metallic conveyor belt 11 supported by rollers 12 at longitudinal stations along a support frame 13. Embedded in the belt 11 is a plurality of antennae 14, each of which may be a single electrical conductor of relatively small gauge, or other type of electrical conductor, which periodically passes the rip detector station 15 at which a transmitter plate 16 and a receiver or detector plate 17 may capacitively couple with the respective antennae. The spacing of the antennae in the belt may be determined in relation to the usual belt speed.

The rip detector system 2 is energized by a conventional electrical power supply 20 coupled to the various portions of the system 2. The transmitter 5 produces an AC signal, for example at a 200 KHz frequency, and such signal is coupled by electrical leads 21 to the transmitter plate 16. Each time an integral antenna 14 passes over the transmitter plate 16, the two become capacitively coupled and the transmitter signal is, accordingly, delivered to or induced in the antenna. While so capacitively coupled to the transmitter plate 16, the antenna 14 also would be capacitively coupled to the receiver plate 17 also inducing therein the transmitter signal, as is disclosed in the above-mentioned U.S. patent. The receiver plate 17 is coupled by leads 22 to provide a raw input signal to an AC amplifier stage 23 at the input of the detector circuitry 1.

As is illustrated at 24 in FIG. 4, for example, such raw input signal will be in the form of an AC signal 25 that is pulse height modulated within an AC envelope 26. The pulse height of such envelope represents the characteristic information indicative of the integrity of the conveyor belt 11. More particularly, as the conveyor belt 11 moves and an antenna 14 approaches alignment for capacitive coupling with the transmitter and receiver plates 16, 17, such pulse envelope begins to expand to a maximum amplitude when the antenna is fully aligned with both plates. As the antenna continues to pass out of alignment with the plates, the amplitude of the pulse envelope decreases. However, if the antenna 14 is broken due to a rip in the belt 11, such pulse modulation would not occur or, at best, would occur with a relatively minimum rise in pulse amplitude. The detector circuitry 1 detects the presence or non-presence of such pulse characteristic information as an indication of the integrity of the conveyor belt. Moreover, it has been discovered that when the conveyor belt 11 stretches with age, for example, or becomes more taut, for example, due to environmental conditions, the spacing between the respective antennae 14 and the transmitter and receiver plates 16, 17 may vary, which also would cause a variation in the height of the pulse envelope 26 as well as increasing the amplitude of the AC signal 25. However, the detector circuitry 1 of the present invention, as will be described further below, is capable of automatically compensating for such variation to continue accurate and reliable rip detection operation.

When the detector circuitry 1 continues periodically to detect integral antennae 14 in the conveyor belt 11, it will, accordingly, produce on an output line 30 a distinguishable output or output signal 31 (FIG. 4) that may be similarly periodically pulsed as an indication of the belt integrity. Output circuitry 32 has a relay time delay circuit 33 responsive to such distinguishable output and, particularly, the non-presence of such periodic pulses, such non-presence indicating the occurrence of a rip or other flaw in the belt 11, to energize an alarm light 34 providing a visible indication of such flaw and/or a monitor control circuit 35 that promptly stops the belt motion minimizing damage thereto. The several parts of the output circuitry 32 are described in more detail in the above mentioned U.S. patent, the disclosure of which is hereby incorporated by reference.

In accordance with the present invention the detector circuitry 1 includes at the output of the AC amplifier stage 23 a full wave rectifier 36 for dividing the amplified raw input signal from the AC amplifier stage into respective opposite polarity signal components; a high pass filter stage 37 for filtering each of those signal components to produce respective opposite polarity filtered signal components; and a summing junction 38 for combining the filtered signal components to produce a substantially DC pulse having an amplitude that is approximately equal to the peak-to-peak amplitude of the raw input signal pulse 26', for example. Accordingly, the rectifier 36, filter 37, and junction 38 provide for the utilization of both polarity components of the raw input signal from the receiver plate 17 thereby enhancing the accuracy, noise immunity, and reliability in forming an internal DC pulse on line 39, such pulse being represented at 40 in FIG. 4. The detector circuitry 1 also includes a level detector 41 that produces the output signal 31 on line 30 in dependence on the magnitude or amplitude of the internal DC pulse 40. When the magnitude of such internal DC pulse is above a given level 42 (FIG. 4), indicating the proper passage of an integral antenna across the transmitter and receiver plates 16, 17, the level detector 41 will produce a pulse output signal on output line 30. However, as long as the level of the internal signal on line 39 does not exceed such given level, the level detector 41 will produce a generally continuous, non-pulsed DC signal on the output line 30. As is disclosed in the above mentioned U.S. patent, too long an interval between such pulses in the output signal will be recognized by the output circuitry as a rip or other flaw in the belt 11.

Turning now in detail to FIG. 4, the detector circuitry 1 of the receiver 6 is illustrated in detail. The AC amplifier 23 constitutes an input circuit 43 for the detector circuitry 1 and includes a preamplifier stage 44, which is coupled by line 22 to the receiver plate 17, an AC gain adjusting potentiometer 45, and a main amplifier 46. A conventional circuit ground connection is provided at 47. The raw input signal from the receiver plate 17 is amplified by the amplifiers 44, 46 and is provided at junction 48 in amplified form shown at 24 as an AC signal that is pulse height modulated with characteristic information indicative of the belt condition.

The full wave rectifier 36, high pass filter 37, and summing junction 38 form a combined circuitry 50 of a voltage doubler 51 and high pass filter 52 that produce from the raw input signal the internal substantially DC pulse signal 40 carrying the characteristic information in the pulse height thereof. A pair of diodes 55, 56 of the full wave rectifier 36 divide the amplified raw input signal at junction 48 into opposite polarity signal components represented at 57, 58, respectively, with each having an average DC ripple level and a pulse impressed thereon such pulse representing the indicated characteristic information. A pair of conventional resistor and capacitor filters 60, 61 smooth such rippled DC portions of the signal components 57, 58. Moreover, a pair of resistor and capacitor high pass filters 62, 63 pass substantially only the pulsed portions of signals 57, 58 to the summing junction 38, the latter including a conventional operational amplifier 64 with a feed back resistor 65. One of the signals 57, 58 is delivered to the non-inverting input of the operational amplifier 64, and the other is delivered to the inverting input thereof. Since the two pulses input to the amplifier 64 are of opposite polarity and since such amplifier effects a polarity inversion of one of those signals, the output signal produced at the output 66 of such amplifier is in effect a substantially DC signal, for example ordinarily having a zero voltage level, as is shown at 40', with the characteristic information pulse 40 impressed thereon, such pulse, then, having an amplitude that is approximately twice that of the two pulses input to the amplifier 64. A diode 67 assures passage from the output of amplifier 64 only single polarity going portions of the output from amplifier 64, in this case positive going portions, and a further resistor and capacitor filter 68 smoothes the signal passing diode 67 so that there is applied to line 39 a substantially DC signal with the characteristic information pulse 40 periodically impressed thereon as a representation of the integrity of the belt 11.

The amplifier stages 23 and combined circuitry 50 serve as an input circuit for the level detector 41. The level detector 41 includes an operational amplifier 70 functioning as a comparator of the internal DC pulse 40 received at the non-inverting input 71 thereof and an altered reference signal, i.e. the signal level 42, applied to the inverting input 72 thereof. When the level of the internal DC pulse 40 exceeds that of the altered reference signal 42, a pulse 73 of the output signal 31 is produced on the output line 30 of the level detector. However, when the internal DC pulse or the substantially DC signal on which such pulse is carried is below the level of the altered reference signal 42, the output signal 31 from the amplifier 70 will be a substantially continuous DC signal of, for example, zero volts.

The altered reference signal 42 is derived from a combination of a reference signal produced by a reference circuit 74 and a bias signal, which is proportional to a parameter of the raw input signal at junction 48, produced by a bias circuit 75. The reference circuit includes resistors 76, 77, and 78 connected, as shown, between a conventional voltage supply 79 and the circuit ground 47 and the inverting input 72 of the amplifier 70. As long as the voltage supply at connection 79 remains constant, the magnitude of the reference signal delivered to inverting input 72 will remain relatively constant. However, the bias signal will vary in the preferred embodiment according to the magnitude of the raw input signal and, particularly, the average of one rectified half thereof. To obtain such bias signal, the bias circuit includes a voltage limiting resistor 80, a diode half wave rectifier 81, a resistor and capacitor smoothing filter 82, and a further limiting and isolating resistor 83. It will be apparent that as the peak-to-peak amplitude, for example, of the raw input signal 24 at junction 48 varies, say due to variation in the spacing between the transmitter and receiver plate 16, 17 and the antennae 14, the magnitude of the substantially DC bias signal passed through resistor 83 to the inverting input 72 of comparator amplifier 70 also will similarly vary, as will the level of the altered reference signal 42, then, being the combination of the reference and bias signals, applied at the inverting input 72 of the comparator amplifier 70. Thus, as the indicated parameter of the raw input signal varies, so will that of the internal DC pulse 40 and that of the altered reference signal 42, whereby a gain response adjustment of the level detector 41 is effected automatically to maintain the accuracy, reliability, noise immunity, and the like in the proper production of the pulse 73 of output signal 31 correctly representing the integrity of the conveyor belt 11.

It will be appreciated that the combination circuitry 50 and the automatic gain response adjusting level detector 41 may be employed in other circuitry, such as other detector circuits or the like independently of or in connection with a conveyor belt rip detector system.

The embodiments of the invention in which an exclusive property or privilege is claimed are defined as follows.

I, therefore, particularly point out and distinctly claim as my invention:

1. A detection circuit for a conveyor belt rip detector system or the like in which an AC signal is pulse modulated to carry characteristic information indicative of the integrity condition of such conveyor belt or the like, comprising means for producing from such AC signal a substantially DC signal normally at a substantially constant magnitude and carrying such characteristic information as substantially DC pulses, reference means for developing a reference DC signal, comparator means for comparing such substantially DC pulses and such DC reference signal to produce an output indicative of the relative magnitudes thereof as an indication of the integrity of such conveyor belt, and bias means for altering such reference signal to an altered reference signal in proportion to a parameter of such AC signal.

2. The circuit of claim 1, wherein said means for producing comprises a circuit for converting such a pulse modulated AC signal to a substantially DC signal, including full wave rectifier means for dividing such AC signal into respective opposite polarity signal components, filter means for filtering each of such signal components to produce respective opposite polarity filtered components, and summing means for combining such filtered signal components to produce such substantially DC signal.

3. The circuit of claim 1, wherein said bias means comprises means for forming a bias signal proportionally representative of the average magnitude of such AC signal.

4. The circuit of claim 3, wherein said reference means comprises a constant voltage source, and further comprising means for combining such bias signal with such reference signal to form such altered reference signal, and delivery means for delivering such altered reference signal to said comparator means.

5. The circuit of claim 2, wherein said filter means comprises plural smoothing filter means coupled between said full wave rectifier means and said summing means for smoothing respective opposite polarity components to respective substantially DC signals with substantially DC pulses, and plural high pass filter means coupled between the coupling of said full wave rectifier means and of said smoothing filter means and said summing means for passing substantially only such substantially DC pulses to said summing means while blocking such substantially DC signals.

6. The circuit of claim 1, wherein said means for producing comprises means for producing such substantially DC signal as a zero voltage level with such DC pulses impressed thereon.

7. The circuit of claim 2, wherein said summing means comprises means for producing such substantially DC signal as a zero voltage level with such DC pulses impressed thereon.

8. The circuit of claim 2, wherein said filter means comprises a separate smoothing filter means for filtering each of such respective opposite polarity signal components to produce substantially constant magnitude DC signals with substantially DC pulses impressed thereon, high pass filter means for delivering substantially only such opposite polarity substantially DC pulses to said summing means, and wherein said filter means and summing means are cooperatively interrelated to add such opposite polarity substantially DC pulses thereby effectively to approximately double the magnitude thereof.

9. The circuit of claim 2, wherein said bias means comprises means for forming a bias signal proportionally representative of the average magnitude of such AC signal, including rectifier means for converting such AC signal to a substantially DC signal level bias signal, and means for connecting said bias means to receive such AC signal prior to delivery of the latter to said means for producing.

10. A detection circuit for a conveyor belt rip detector system or the like in which an AC signal is pulse modulated as an indication of the integrity condition of such conveyor belt or the like, comprising full wave rectifier means for dividing such AC signal into respective opposite polarity signal components, filter means for filtering each of such signal components to produce respective opposite polarity filtered signal components, summing means for combining such filter signal components to produce a substantially DC signal normally at a substantially constant magnitude and with DC pulses impressed thereon, said filter means comprising a separate smoothing filter means for filtering each of such signal components to produce such substantially DC signal with substantially DC pulses impressed thereon and separate high pass filter means for filtering each of such signal components to block such substantially DC signals and to pass substantially only such substantially DC pulses to said summing means, and output means responsive to such substantially DC pulses for producing a distinguishable output indicative of the integrity of such conveyor belt.

11. The circuit of claim 10, wherein said output means comprises reference means for developing a reference signal, comparator means for comparing such substantially DC signal carrying such substantially DC pulses as characteristic information indicative of the integrity condition of such conveyor belt or the like and such reference signal to produce an output signal indicative of the relative magnitudes thereof as an indication of the integrity of such conveyor belt, and bias means for altering such reference signal in proportion to a parameter of such AC signal.

12. The circuit of claim 10, wherein said rectifier means and summing means comprise a voltage doubling circuit, said summing means comprising an amplifier having inverting and non-inverting inputs, and means for coupling one of such filtered signal components to said inverting input and one to said non-inverting input, whereby the output of said amplifier represents the unsigned sum of such opposite polarity substantially DC pulses.

13. The circuit of claim 10, wherein said summing means comprises means for producing such substantially DC signal as a zero voltage level with such DC pulses impressed thereon.

14. The circuit of claim 11, wherein said bias means comprises means for forming a bias signal proportionally representative of the average magnitude of such AC signal, including rectifier means for converting such AC signal to a substantially DC signal level bias signal, and means for connecting said bias means to receive such AC signal prior to delivery of the latter to said means for producing.

15. A variable level detecting circuit, comprising input circuit means for receiving a raw input AC signal containing characteristic information as pulse height modulations of such raw input AC signal, means for producing from such raw input AC signal a substantially DC signal normally at a substantially constant magnitude and carrying such characteristic information as substantially DC pulses, reference means for developing a reference signal, comparator means for comparing such substantially DC pulses and such reference signal to produce an output signal indicative of the relative magnitudes thereof, and bias means for altering such reference signal to an altered reference signal in proportion to a parameter of such raw input AC signal.

16. The circuit of claim 15, wherein such raw input AC signal is a pulse height modulated AC signal, said means for producing comprises a circuit for converting such pulse height modulated AC signal to such substantially DC signal, including full wave rectifier means for dividing such AC signal into respective opposite polarity signal components, filter means for filtering each of such signal components to produce respective opposite polarity filtered signal components, and summing means for combining such filtered signal components to produce such substantially DC signal.

17. The circuit of claim 15, wherein said comparator means comprises an operational amplifier with inverting and non-inverting input means, respectively, for receiving one of such substantially DC signals and such altered reference signal, and output means for producing such output signal.

18. The circuit of claim 15, wherein said bias means comprises means for forming a bias signal proportionally representative of the average magnitude of such raw input signal, including rectifier means for converting such raw input signal to a substantially DC signal level bias signal.

19. The circuit of claim 18, wherein said rectifier means comprises a half wave rectifier.

20. The circuit of claim 18, wherein said means for forming further comprises smoothing filter means for smoothing such substantially DC signal level.

21. The circuit of claim 18, wherein said reference means comprises a constant voltage source, and further comprising means for combining such bias signal with such reference signal to form such altered reference signal, and delivery means for delivering such reference signal from said source to said comparator means.

22. The circuit of claim 16, wherein said filter means comprises plural high pass filters, one for each opposite polarity component.

23. The circuit of claim 16, wherein said summing means comprises a summing junction.

24. The circuit of claim 16, wherein said full wave rectifier means comprises a pair of diodes connected in opposite polarity relation to receive such AC signal.

25. The circuit of claim 15, wherein said means for producing comprises means for producing such substantially DC signal as a zero voltage level with such DC pulses impressed thereon.

26. The circuit of claim 16, wherein said summing means comprises means for producing such substantially DC signal as a zero voltage level with such DC pulses impressed thereon.

27. The circuit of claim 16, wherein said filter means comprises a separate smoothing filter means for filtering each of such respective opposite polarity signal components to produce substantially constant magnitude DC signals with substantially DC pulses impressed thereon, high pass filter means for delivering substantially only such opposite polarity substantially DC pulses to said summing means, and wherein said filter means and summing means are cooperatively interrelated to add such opposite polarity substantially DC pulses thereby effectively to approximately double the magnitude thereof.

28. The circuit of claim 16, wherein said bias means comprises means for forming a bias signal proportionally representative of the average magnitude of such raw input signal, including rectifier means for converting such raw input signal to a substantially DC signal level bias signal, and means for connecting said bias means to receive such raw input signal prior to delivery of the latter to said means for producing.

* * * * *